J. P. BECK.
SAD IRON HEATER.
APPLICATION FILED MAY 25, 1912.
1,132,549.
Patented Mar. 23, 1915.
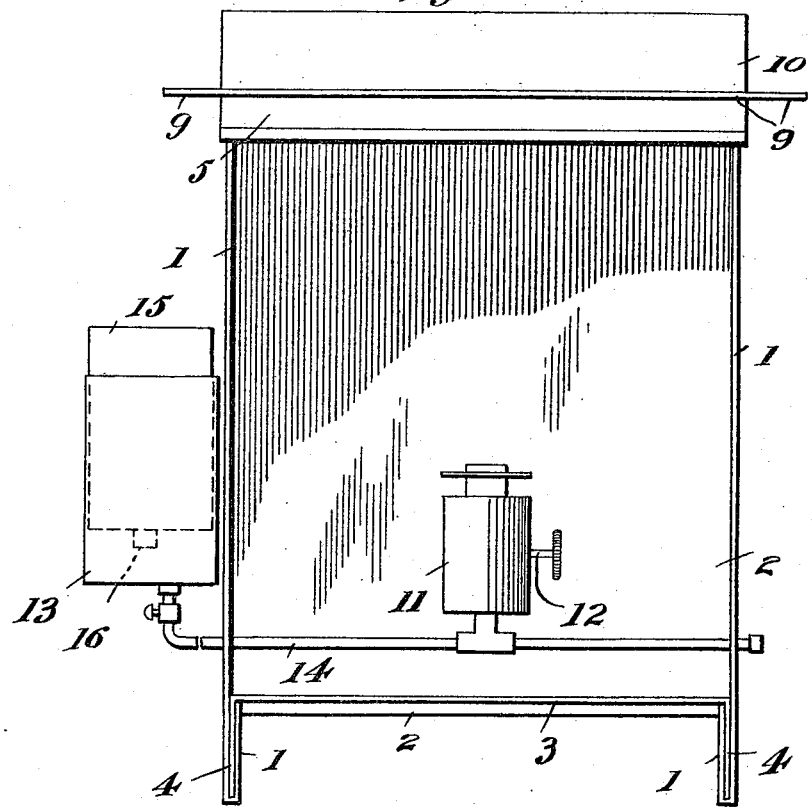
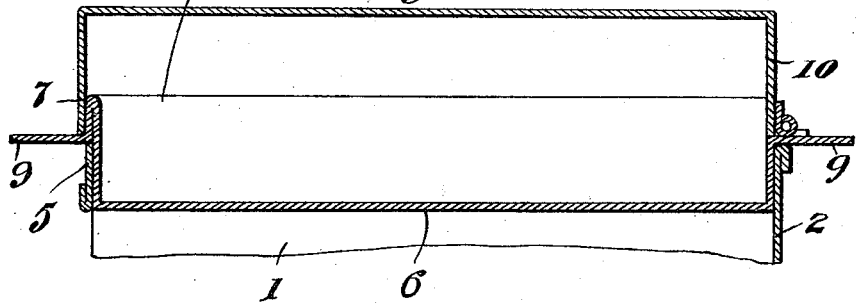
Witnesses
Inventor
J. P. Beck.
By A. L. Jackson,
Attorney
THE NORRIS PETERS CO., PHOTO-LITHO., WASHINGTON, D. C.

UNITED STATES PATENT OFFICE.

JOSEPH P. BECK, OF SNYDER, TEXAS.

SAD-IRON HEATER.

1,132,549.  Specification of Letters Patent.  Patented Mar. 23, 1915.

Application filed May 25, 1912. Serial No. 699,769.

*To all whom it may concern:*

Be it known that I, JOSEPH P. BECK, a citizen of the United States, residing at Snyder, in the county of Scurry and State of Texas, have invented certain new and useful Improvements in Sad-Iron Heaters, of which the following is a specification.

My invention relates to heaters, and more particularly to sad-iron heaters, and the object is to provide a simple portable device for heating sad-irons, which is simple in construction and light, for easy carrying.

Another object is to provide means for confining the heat about the irons in an inclosure which is easily opened and closed.

Other objects and advantages will be fully explained in the following description, and the invention will be more particularly pointed out in the claims.

Reference is had to the accompanying drawings, which form a part of this application.

Figure 1 is a front elevation of the device. Fig. 2 is a vertical section of the inclosure, supported by the device.

Similar characters of reference are used to indicate the same parts throughout the several views.

This heater has an open front supported by side walls 1 and a back wall 2. The side walls 1 extend down and form two feet, which extend the entire depth backward and the same pieces of metal are bent upwardly under the bottom 3 which has legs 4 caught in the fold of the side pieces 1. A bar 5 connects the pieces 1 at the top of the front. A pan 6 rests on the bar 5 and on the side walls 1 and the back wall 2. This pan has flanges 7 and 8, respectively, at the front and sides, projecting upwardly, and horizontal flanges 9 on the four sides. A cover 10 is hingedly connected to the pan 6 at the back edge, being connected to the flange 9, and when in the closed position the cover incloses the flanges 7 and 8. The cover is simply an inverted pan, forming an inclosure for the sad-irons, which are placed in the pan 6. The cover 10 on the sides and front rests on the flanges 9, outside of the flanges 7 and 8. The burner 11 is connected to a pipe 14, and the pipe 14 is connected to a tank 13. An inverted tank 15 is mounted in the tank 13, and provided with a valve 16, which automatically feeds oil from the tank 15 to the tank 13, and the oil is fed from tank 13 to pipe 14. A regulator 12 is provided for controlling the amount of oil that escapes through the burner 11.

It is seen that the cover not only serves as a cover, but as a heat-containing drum, and that this cover is easily raised for convenience in inserting or removing the sad-irons. The sad-irons are protected from smoke.

What I claim, is,—

1. A sad-iron heater, comprising a support and means connected with said support for generating heat, and an inclosure carried on top of said support, consisting of a pan having horizontal flanges projecting therefrom intermediate the bottom and the top edges, and having vertical flanges on two sides and the front, and a cover hingedly connected to one of said horizontal flanges and inclosing said vertical flanges.

2. A heater for sad-irons, comprising a box-shaped support, a burner in said support, a tank for supplying oil to said burner, a pan carried on said support and having horizontal flanges projecting therefrom and resting on the four sides of said support and vertical flanges on the front and two sides, and a box-shaped cover hingedly connected to the rear horizontal flange, and inclosing said vertical flanges, and forming a heating drum together with said pan for heating sad-irons.

In testimony whereof, I set my hand in the presence of two witnesses, this 22nd day of April, 1912.

JOSEPH P. BECK.

Witnesses:
 A. L. JACKSON,
 J. W. STITT.

Copies of this patent may be obtained for five cents each, by addressing the "Commissioner of Patents, Washington, D. C."